US006782390B2

(12) United States Patent
Lee et al.

(10) Patent No.: US 6,782,390 B2
(45) Date of Patent: *Aug. 24, 2004

(54) EXECUTION OF MULTIPLE MODELS USING DATA SEGMENTATION

(75) Inventors: Yuchun Lee, Charlestown, MA (US); Ruby Kennedy, Lincoln, MA (US); Robert Crites, Hollis, NH (US)

(73) Assignee: Unica Technologies, Inc., Lincoln, MA (US)

(*) Notice: Subject to any disclaimer, the term of this patent is extended or adjusted under 35 U.S.C. 154(b) by 132 days.

This patent is subject to a terminal disclaimer.

(21) Appl. No.: 10/092,850

(22) Filed: Mar. 7, 2002

(65) Prior Publication Data

US 2003/0018601 A1 Jan. 23, 2003

Related U.S. Application Data

(63) Continuation of application No. 09/208,037, filed on Dec. 9, 1998, now Pat. No. 6,542,894.

(51) Int. Cl.⁷ .............................................. G06F 17/30
(52) U.S. Cl. .............................. 707/101; 707/2; 707/3; 707/102; 707/103; 707/104
(58) Field of Search ............................... 707/1, 2, 5, 7, 707/8, 101, 104, 3, 102, 103; 706/12; 705/7

(56) References Cited

U.S. PATENT DOCUMENTS 5,426,780 A * 6/1995 Gerull et al. .................. 707/3
5,692,107 A * 11/1997 Simoudis et al. ............. 706/12
5,842,199 A * 11/1998 Miller et al. ................... 707/2
5,842,200 A * 11/1998 Agrawal et al. ............... 707/1
5,909,681 A * 6/1999 Passera et al. ................. 707/8
6,012,056 A * 1/2000 Menlove ........................ 707/5
6,038,538 A * 3/2000 Agrawal et al. .............. 705/7
6,044,366 A * 3/2000 Graffe et al. ................... 707/2
6,154,739 A * 11/2000 Wrobel .......................... 707/6
6,182,133 B1 * 1/2001 Horvitz ...................... 709/223
6,189,005 B1 * 2/2001 Chakrabarti et al. .......... 707/6
6,263,334 B1 * 7/2001 Fayyad et al. ................. 707/5
6,301,579 B1 * 10/2001 Becker ....................... 707/102
6,317,752 B1 * 11/2001 Lee et al. ................... 707/104
6,542,894 B1 * 4/2003 Lee et al. ................... 707/101

OTHER PUBLICATIONS

"Was ist Lotto am Samstag?", Toto–Lotto in Bayern (Internet: www.staatliche–lotterieverwaltung.de/spiele/lotto–as.htm).

* cited by examiner

*Primary Examiner*—Thuy N. Pardo
(74) *Attorney, Agent, or Firm*—Fish & Richardson P.C.

(57) ABSTRACT

A method executed on a computer for modeling expected behavior is described. The method includes scoring records of a dataset that is segmented into a plurality of data segments using a plurality of models and converting scores of the records into probability estimates. Two of the techniques described for converting scores into probability estimates are a technique that transforms scores into the probabilities estimates based on an equation and a binning technique that establishes a plurality of bins and maps records based on a score for the record to one of the plurality of bins.

18 Claims, 14 Drawing Sheets

EXECUTION OF MULTIPLE MODELS USING DATA SEGMENTATION

This is a continuation of application Ser. No. 09/208,037, filed Dec. 9, 1998, now U.S. Pat. No. 6,542,894.

BACKGROUND

This invention relates generally to data mining software.

Data mining software extracts knowledge that may be suggested by a set of data. For example, data mining software can be used to maximize a return on investment in collecting marketing data, as well as other applications such as credit risk assessment, fraud detection, process control, medical diagnoses and so forth. Typically, data mining software uses one or a plurality of different types of modeling algorithms in combination with a set of test data to determine what types of characteristics are most useful in achieving a desired response rate, behavioral response or other output from a targeted group of individuals represented by the data. Generally, data mining software executes complex data modeling algorithms such as linear regression, logistic regression, back propagation neural network, Classification and Regression (CART) and $Chi^2$ (Chi squared) Automatic Interaction Detection (CHAID) decision trees, as well as other types of algorithms on a set of data.

Results obtained by executing these algorithms can be expressed in a variety of ways. For example, an RMS error, $R^2$ value, confusion matrix, gains table or multiple lift charts or a single lift chart with multiple lift curves. Based on these results the decision maker can decide which model (i.e., type of modeling algorithm and learning parameters) might be best for a particular use.

SUMMARY

In many real world modeling problems, often a single variable or set of input variables can have a significantly strong influence on predicting behavioral outcomes. The data mining software allows for execution of multiple models based on selective segmentation of data using models designed for and trained with the particular data segments. When the models operate on each of the data segments, they can produce a simple lift chart to show the performance of the model for that segment of data.

While a single lift chart may provide useful results, the single lift chart does not indicate the usefulness of the multiple model approach. A single lift chart does not indicate how the multiple models should optimally combined and used. In addition, the performance of individual models based on data segmentation can not be directly compared to that of a single, non-segmented model, to determine whether the improvement, if any, exhibited with the multiple data segment modeling approach justifies the additional modeling expenses associated therewith.

The scores generated for these models cannot be simply sorted from among different models when a priori data distributions have been modified. This is typical in problems such as response modeling, when a class or behavior of interest represents a small sample of the overall population (e.g., response rates are typically 1–2%). Scores cannot be simply combined and sorted from multiple models because the scores no longer represent probabilities of the predicted outcomes. Records from a less represented class (e.g., responders to a mailing campaign) are typically over sampled relative to the other class (e.g., non-responders). While this sampling technique provides improved prediction accuracy, the model scores for many data-driven algorithms no longer map directly to probabilities and therefore cannot be easily combined from multiple models.

According to an aspect of the present invention, a method executed on a computer for modeling expected behavior includes scoring records of a dataset that is segmented into a plurality of data segments using a plurality of models.

According to a further aspect of the present invention, a computer program product residing on a computer readable medium for modeling expected behavior includes instructions for causing a computer to score with a plurality of models records of a dataset that is segmented into a like plurality of data segments.

According to a further aspect of the present invention, a method executed on a computer for modeling expected behavior includes scoring records of a dataset that is segmented into a plurality of data segments using a like plurality of models and combining results obtained from scoring the records into a single representation of the expected behavior.

According to a further aspect of the present invention, a computer program product residing on a computer readable medium for modeling expected behavior includes instructions for causing a computer to score with a plurality of models records of a dataset that is segmented into a like plurality of data segments and combine results obtained from scoring the multiple models into a single representation of the expected behavior.

One of more of the follow advantages are provided the one or more aspects of the invention. Multiple model executions on segmented data provides a technique to avoid the significantly strong influence on predicting behavioral outcomes that a single variable or set of input variables may have on a modeling problem. A summary lift chart that combines results from multiple model executions on segmented data provides a technique to allow a decision maker to see the expected performance of modeling from all combined models and determine whether the improvement justifies the additional modeling expense. In addition, this technique applies to all algorithms that do not generate scores representing probabilities.

In addition, the approach set out above allows for modeling real world modeling problems where a single variable or set of input variables have a significantly strong influence on predicting behavioral outcomes. The approach allows for execution of multiple models based on selective segmentation of data using models designed for and trained with the particular data segments. With the results combining approach the results from these multiple segmented-model executions are combined into a single, summary representation of the results. The multiple segmented-model executions can be combined into a single, summary representation of the results that maintains an order of results within a model execution while arranging results in descending order among different model executions.

DETAILED DESCRIPTION

Figure 1:
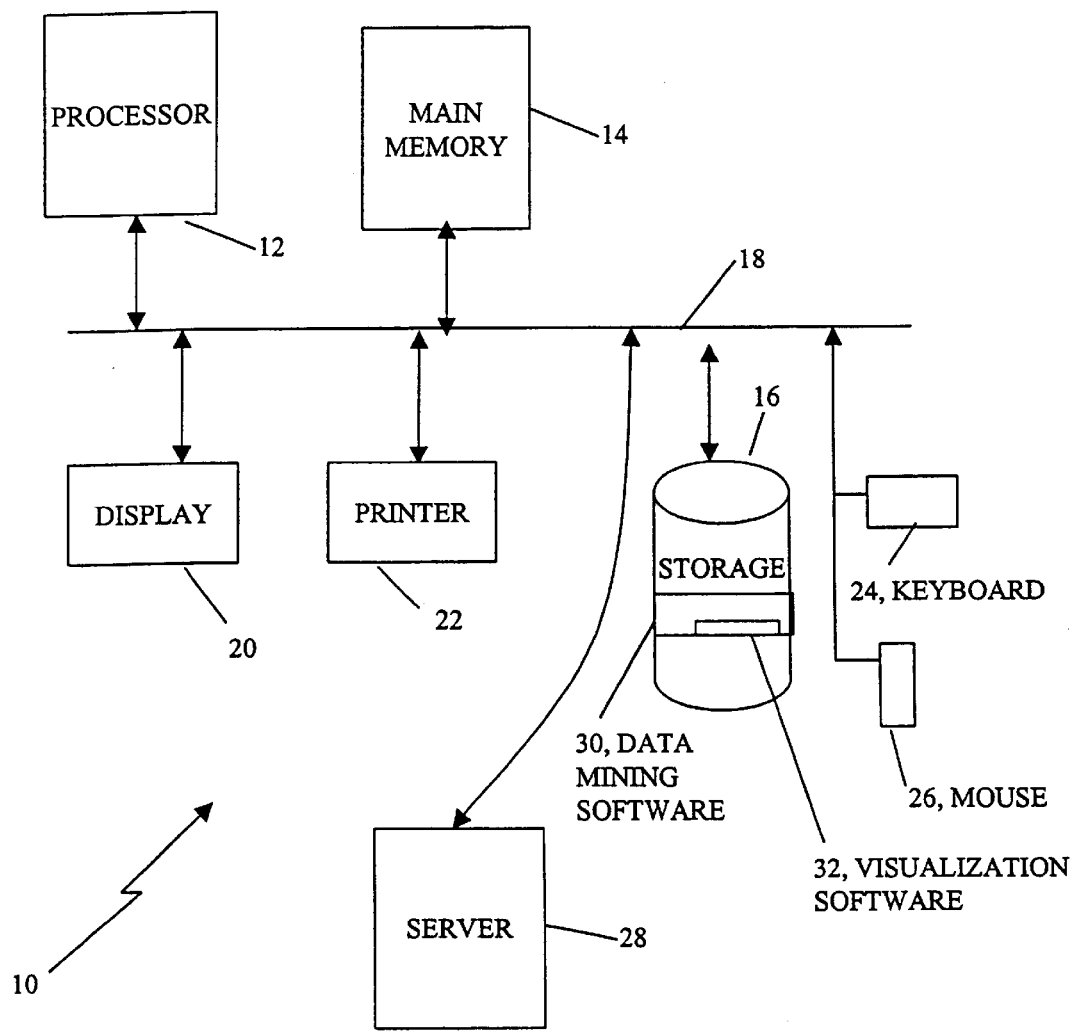
FIG. 1 is a block diagram of a computer system executing data mining software including visual representation software.

Referring now to FIG. 1, a computer system 10 includes a CPU 12, main memory 14 and persistent storage device 16 all coupled via a computer bus 18. The system 10 also includes output devices such as a display 20 and a printer 22, as well as user input devices such as a keyboard 24 and a mouse 26. Not shown in FIG. 1 but would necessarily be included in a system of FIG. 1 are software drivers and hardware interfaces to couple all the aforementioned elements to the CPU 12.

The computer system 10 also includes data mining software and in particular multiple model, data segment data mining software 30 (hereinafter data mining software 30) that also includes results combining software 32 that combines results produced from the data mining software 30. The data mining software 30 may reside on the computer system 10 or may reside on a server 28, as shown, which is coupled to the computer system 10 in a conventional manner such as in a client-server arrangement. The details on how this data mining software is coupled to this computer system 10 are not important to understand the present invention.

Generally, data mining software 30 executes complex data modeling algorithms such as linear regression, logistic regression, back propagation neural network, Classification and Regression (CART) and $Chi^2$ Automatic Interaction Detection (CHAID) decision trees, as well as other types of algorithms that operate on a dataset. Also, the data mining software 30 can use any one of these algorithms with different modeling parameters to produce different results. The data mining software 30 can render a visual representation of the results on the display 20 or printer 22 to provide a decision maker with the results. The results that are returned can be based on different algorithm types or different sets of parameters used with the same algorithm. One type of result that the software can return is in the form of a lift chart. The results can also be returned without a visual depiction of the results such as the score itself, calculating an RMS value, and so forth. One approach is to render a graph or other visual depiction of the results.

Each model execution or algorithm can be used to generate a corresponding lift curve that is displayed on a lift chart. A preferred arrangement for providing such lift curves on a lift chart is described in U.S. patent application, Ser. No. 09/176,370 filed Oct. 12, 1998, entitled "VISUAL PRESENTATION TECHNIQUE FOR DATA MINING SOFTWARE" by Yuchun Lee et al., which is incorporated herein by reference and is assigned to the assignee of the present invention.

In many real world modeling problems, often a single variable or set of input variables has a significantly strong influence on predicting behavioral outcomes. The data mining software 30 described below allows for execution of multiple models based on selective segmentation of data using models designed for and trained with the particular data segments. The data mining software includes the results combining software 32 that combines the results from these multiple segmented-model executions into a single, summary representation of the results.

Preferably, the multiple segmented-model executions are combined into a single, summary representation of the results that maintains an order of results within a model execution while arranging results in descending order among different model executions.

The results combining software 32 provides an optimal combination of results from multiple models. The results combining software 32 can render the results in any of a number of ways to the user, for example, the model scores, a summary RMS error and $R^2$ values, or a confusion matrix, or summary gains table or summary lift chart can be used. The results combining software 32 will describe the generation of a summary lift chart.

Figure 2:
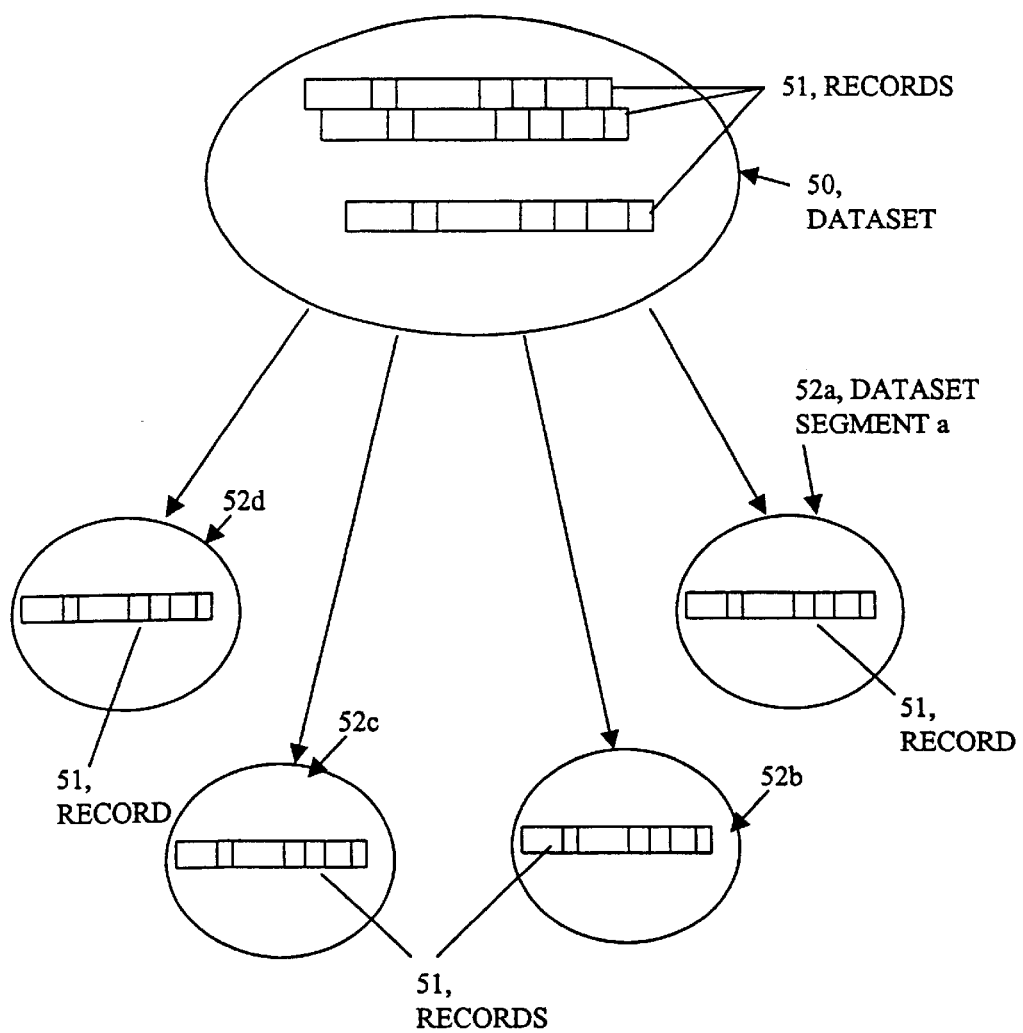
FIG. 2 is a block diagram of a dataset.
Figure 2A:
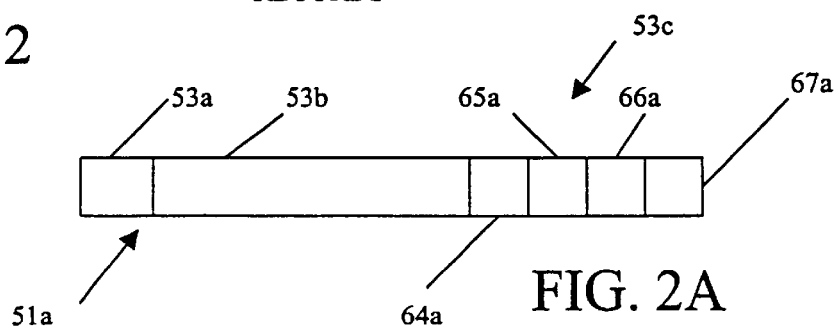
FIG. 2A is a diagram of a record.

Referring now to FIGS. 2 and 2A, a dataset 50 includes a plurality of records 51. The records 51 (FIG. 2A) can include an identifier field 53a, as well as one or a plurality of fields 53b corresponding to input variable values that are used in the modeling process 30. The records 51 also include one or more result fields 53c that are used by the modeling process to record scores for the record that measure the expected behavior of a prospect represented by the record. For example, for a record 51a, the result fields include a score field 64a, a response rate field 65a, a bin number field 66a, and a new response rate field 67a. The dataset 50 often includes a very large number of such records 51. The data mining software 30 or user partitions this dataset 50 into a series of data segments.

The data segments 52a–52d are selected based upon some expertise that is applied to the dataset 50. The dataset 50 is segmented into any number of data segments of two or greater. Generally, the number of segments is selected based on what is suitable for the particular problem. For example, here the dataset 50 is segmented into four data segments 52a–52d having respective records 51a–51d. The selection of the number of segments, as well as what input variables are used for data segmentation, can be accomplished in a number of ways. Manual techniques such as domain experience can be used to identify appropriate segments and variables over which to segment the records. Other types of data analysis tools can also be used such as sensitivity analysis of variables in the model based on derivative functions or entropy analysis or techniques such as data visualization. Experiments can be developed to determine optimal split points and variables to use.

In addition, the number of segments can be determined based on the size of the data sample. Further, the data segments may be disjoint or overlapping. For example, in the case where a single record e.g., 51a–51d falls into one or more data segments e.g., 52a–52d, some criteria is applied to ultimately select the model to use to score the record, or a technique such as a weighted average is provided to combine the model scores for the overlapping records. In this discussion it is assumed that the data segments are disjoint for simplicity of explanation.

The identification of segments is often dependent on the problem that the data mining software is trying to solve. For example, if the data mining software is performing a list selection process (as will be described in detail below), each segment is a different list. The problem needs to be considered in determining how a data set is segmented.

Figure 3:
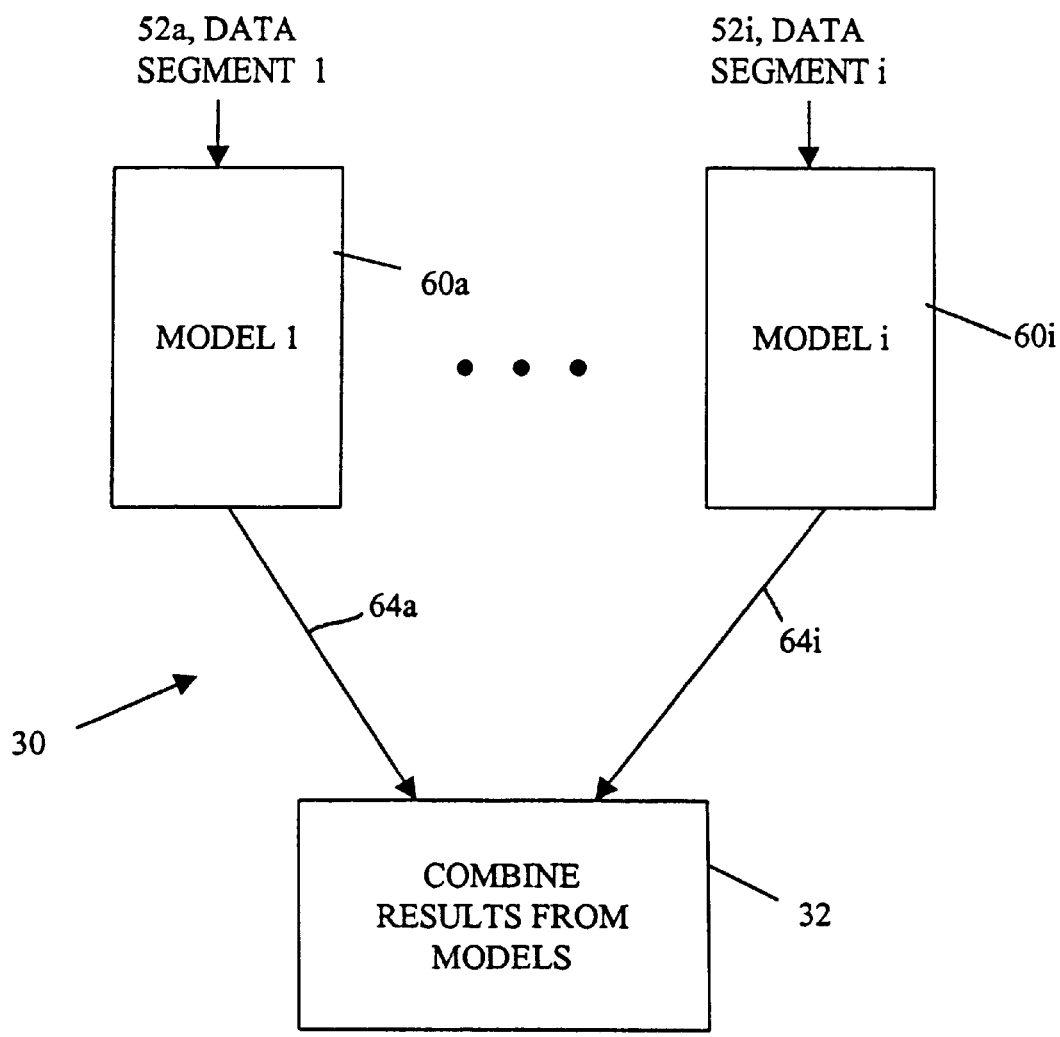
FIG. 3 is a block diagram of data mining software that executes multiple models or algorithms.

Referring now to FIG. 3, multiple models 60a–60i (at least two) are used to model respective, corresponding segments (at least two) 52a–52i (FIG. 2). The data segments 52a–52i are built using one or more variables that are important in the single model, and which may vary from model to model. The individual multiple models 60a–60i are designed and tested for the respective one of the data segments 52a–52i. The results 64a–64i of modeling each of the data segments are fed to results combining software 32. Preferably, they are combined in a manner that maintains the integrity of the modeling process.

The results combining software 32 maps model scores to probabilities of achieving the desired behavioral response (or response rates). This can be accomplished in a number of ways. Two different techniques are described. The first technique (as described in conjunction with FIGS. 4 and 5) estimates probabilities by binning the model scores and computing response rates empirically. The second technique (as described in conjunction with FIGS. 9 and 10) converts model scores into probability estimates.

Figure 4:
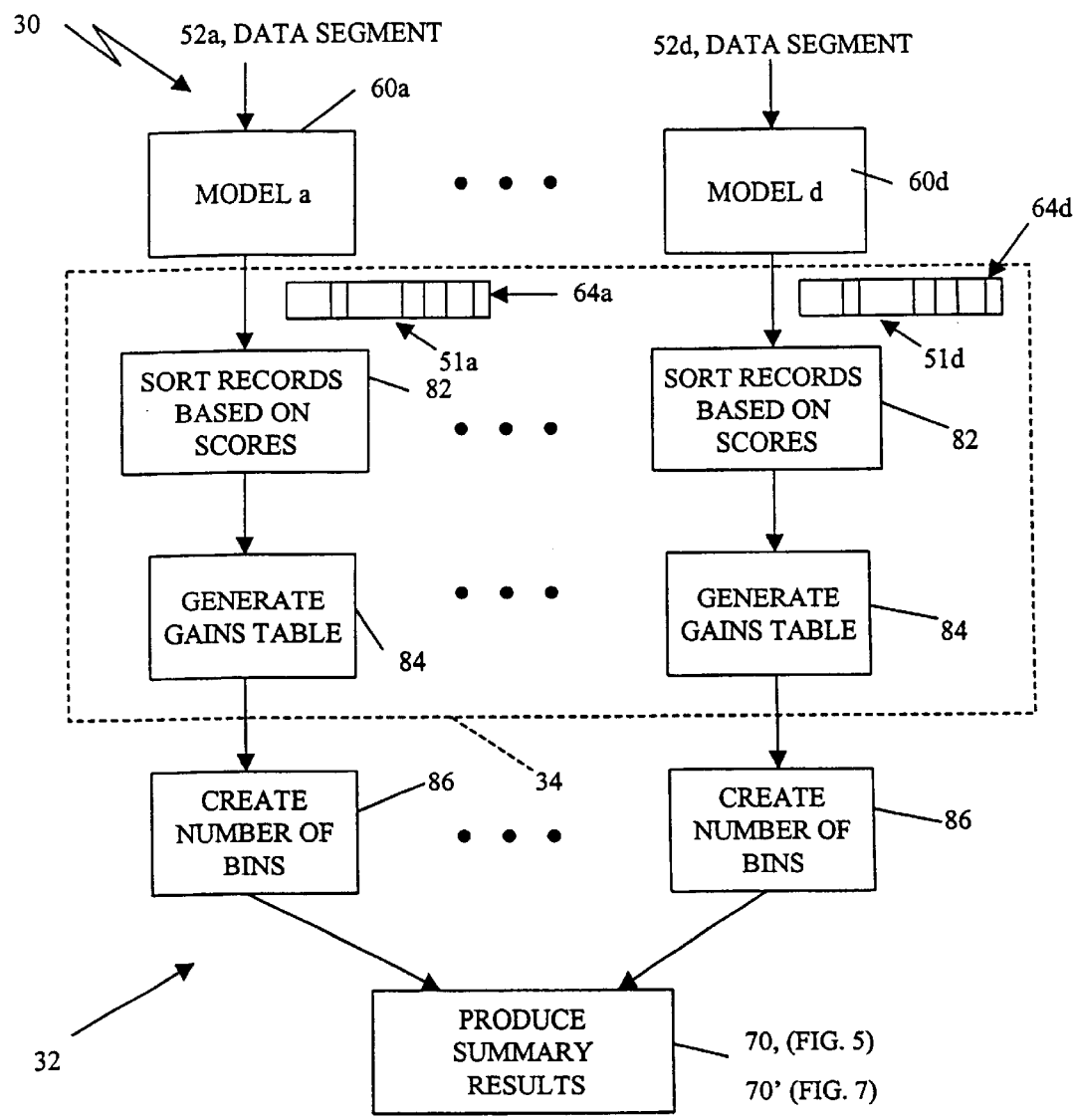
FIG. 4 is a flow chart of the visual representation software for the data mining software of FIG. 1.

Referring now to FIG. 4, the data mining software 30 uses here four models 60a–60d to score those records 5a–51d from respective data segments 52a–52d for which the respective one of models 60a–60d was designed. Thus, for example, as shown in FIG. 4, the records 51a from data segment 52a are evaluated or scored by model 60a and records 51d from data segment 52d are evaluated or scored by model 60d, and so forth. The models 60a–60d are used to score, i.e., produce results 64a–64d for each of the records 51a–51d. The scores are registered in the records 51a–51d in respective fields 64a–64d or in alternative storage locations. The results combining software 32 can process results in parallel, as shown, or serially from running the segmented, multiple modeling process.

The results combining software 32 includes a process 34 that sorts 82 records in descending order based on the scores provided from executing the models 60a–60d on the data segments 52a–52d. Generally, higher scores are assumed to reflect a greater likelihood of the modeled response behavior. The process 34 generates 84 a gains table or derives a gains table for the data segment 52a–52d that the model 60a–60d scored. The gains table includes a segment number field, a number of records per segment field (which should generally be of equal population) and a number of responders per segment field. Responders are those records that exhibit the desired behavior. The gains table data is used to compute a percent response rate per segment, a cumulative number of records, a cumulative response rate and a cumulative total of all responders.

TABLE 1 shows an example format for this information.

TABLE 1

| seg. no. | Score (%) | no. recds (n) | no. of re- sponders (r) | % Resp (r/n) | Cum. No. Re- sponses (N) | Cum. re- spon- ders (R) | Cum. % Tot. Re- sponse (R/N) |
|---|---|---|---|---|---|---|---|
| 1 | 100.00–95.40 | 119 | 96 | 80.6723 | 119 | 96 | 54.55 |
| 2 | 95.40–88.50 | 57 | 42 | 73.6842 | 176 | 138 | 78.41 |
| 3 | 88.50–33.30 | 56 | 16 | 28.5714 | 232 | 154 | 87.5 |

TABLE 1-continued

| 4 | 33.30–15.30 | 48 | 8 | 16.6667 | 280 | 162 | 92.05 |
|---|---|---|---|---|---|---|---|
| 5 | 15.30–15.20 | 67 | 4 | 5.9701 | 347 | 166 | 94.32 |
| 6 | 15.20–13.00 | 43 | 0 | 0.0000 | 390 | 166 | 94.32 |
| 7 | 13.00–12.90 | 119 | 4 | 3.3613 | 509 | 170 | 96.59 |
| 8 | 12.90–6.90 | 49 | 2 | 4.0816 | 558 | 172 | 97.73 |
| 9 | 6.90–6.80 | 66 | 3 | 4.5455 | 624 | 175 | 99.43 |
| 10 | 6.80–0.00 | 62 | 1 | 1.6129 | 686 | 176 | 100.00 |

| | No. | No. Resp | Ave resp. |
|---|---|---|---|
| Totals | 686 | 176 | 25.6560 |

The results combining software 32 selects 86 a number of bins for each lift chart to be combined. The number of bins can be selected using any suitable criteria. For example, the number of bins can be an absolute value, can be based upon the number of responders, and so forth. The results combining software 32 uses the number of bins selected for each model execution to produce 70 a summary lift chart that combines the results from the-models into a single, summary lift chart taking into consideration the response rates that were generated for all model executions. Preferred approaches 70, 70' for producing summary lift charts are described in conjunction with FIGS. 5–7.

Figure 5:
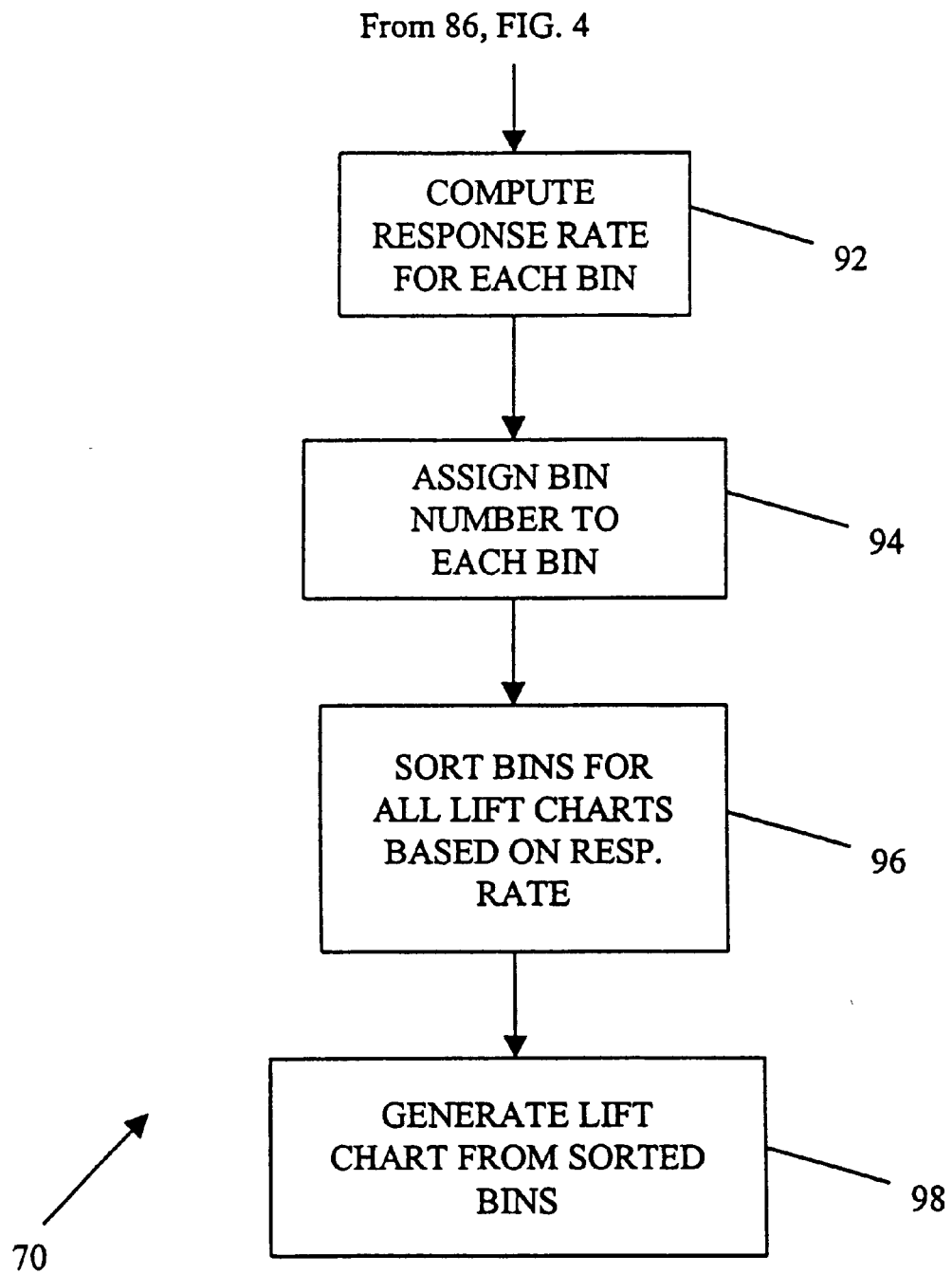
FIG. 5 is a block diagram of a technique to produce a summary lift chart representation from multiple model executions.

Referring now to FIG. 5, a process 70 for producing a summary lift chart is shown. The process 70 receives results from the lift chart generating process 34 (FIG. 4) and the bin creating process 86 (FIG. 4). The process 70 computes 92 response rates (field 65a, FIG. 2A) for each of the bins identified in FIG. 4. The response rates for the bins are based on the number of responders divided by the number of records.

Exemplary PRW macro code is shown below in TABLE 2.

TABLE 2

PRW Macro Code

```
V7:
;Sort data in descending order by score
; Score is the column containing model scores, Actual contains the
; binary response data
sorted = sort(score, {score, actual}, descend)
; Compute # of values in each bin
c = count(actual)
num_resp = sum(select(2, sorted))
num_bins = int(num_resp/30)
bin_size = int(c/num_bins)
; Create rows of scores w1
; Create rows of desired w2
;s =select(1, sorted) ; sorted scores
d = select(2, sorted) ; sorted desired responses
;w1 = slide_window(bin_size, s)
w2 = slide_window(bin_size, d)
;s1 = subsample(num_bins, w1)
s2 = subsample(num_bins, w2)
num_right = sum(s2, row)
resp = (num_right/bin_size)*100
; first col = response rate
; 2nd col = number of responders in the bin
; 3rd col = bin size (repeated)
; 4th col = sorted response column
```

TABLE 2-continued

PRW Macro Code

Output = {resp, num_right, repeat(num_bins, bin_size), select(2, sorted)}
V7 =output Each record in each data segment is assigned 94 one of the bin numbers in field 66a (FIG. 2A), with the bin numbers starting at bin number 2 and being incremented by 1 up to bin numbers NUM_BINS+1. All records in the same bin are assigned the same bin number. Exemplary PRW macro code for generating bin numbers 86 is shown below in TABLE 3.

TABLE 3

PRW Macro Code for Generating Bin Numbers

```
V11:
; Create a column of bin numbers
num_bins = int(sum(V10/30))
Col_length = count(C1)
num_pats_seg = int(Col_length/Num_bins)
Ones = repeat(Col_length, 1)
; Repeat last bin # to handle left over rows (when it doesn't divide
; evenly by # bins)
SegNums = (1 to Num_bins+1, Num_bins+1)
x=offset(Ones)
; Add 2 to start seg # at 2 (this way 0/1 of response column doesn't get
; substituted)
y = int(x/num_pats_seg)+2
V11 = Ones*SegNums[y]
```

The process sorts 96 the bins for all the lift charts based upon the response rate provided for each bin. Sorting the bins, permits bins associated with one of the data segments to be interleaved with others of the data segments. Thus, for example, assuming that in the example described above, model 60b produced some bins having higher response rates than model 60a, those bins from model 60b could be arranged ahead of bins from model 60a. That is, the bins are interleaved from the various models based on response rates. Once the bins are sorted, the process 70 generates 98 a lift chart from the sorted bins.

Figure 6A:
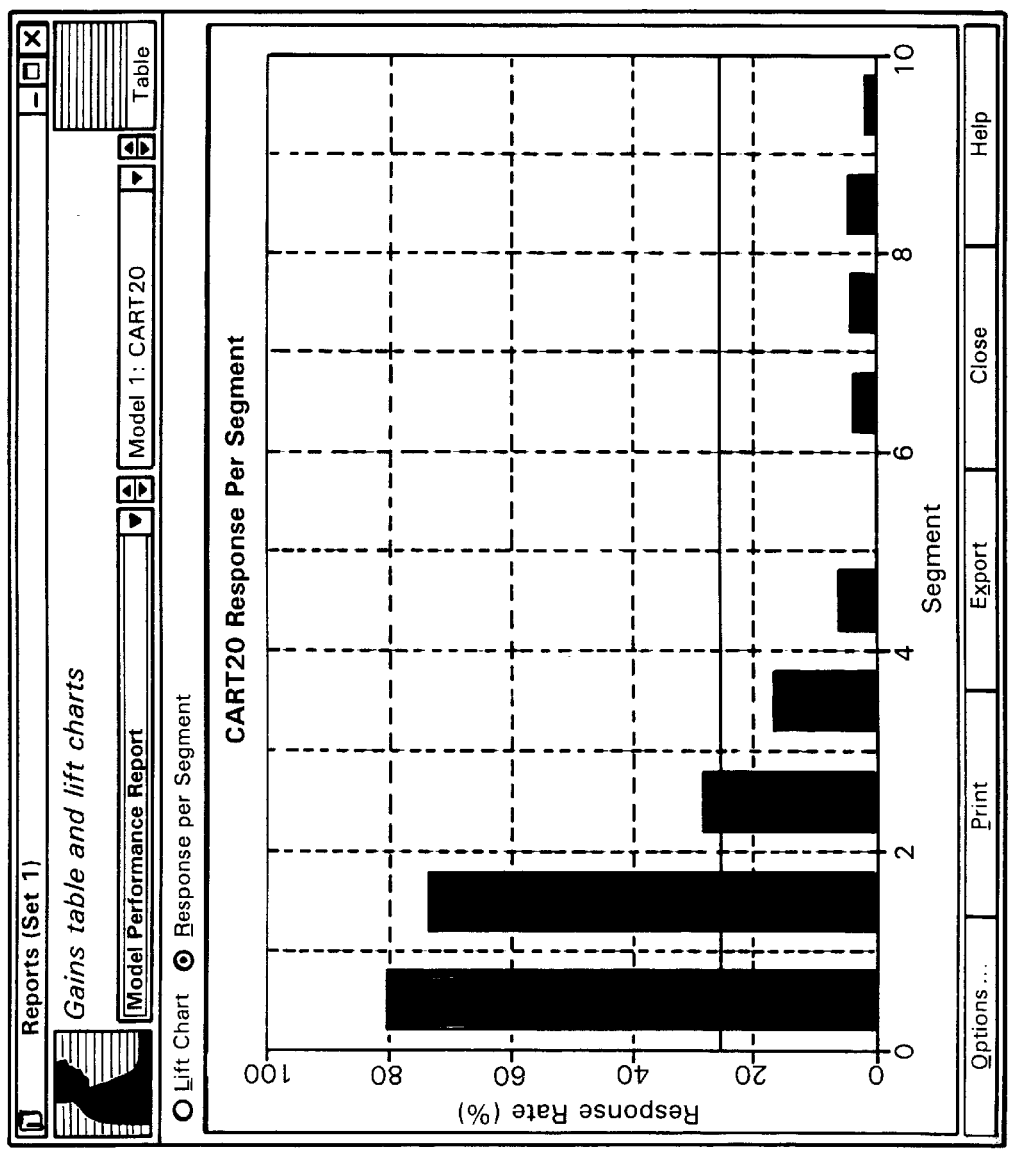
FIG. 6A is a diagram depicting a response segment graph.
Figure 6B:
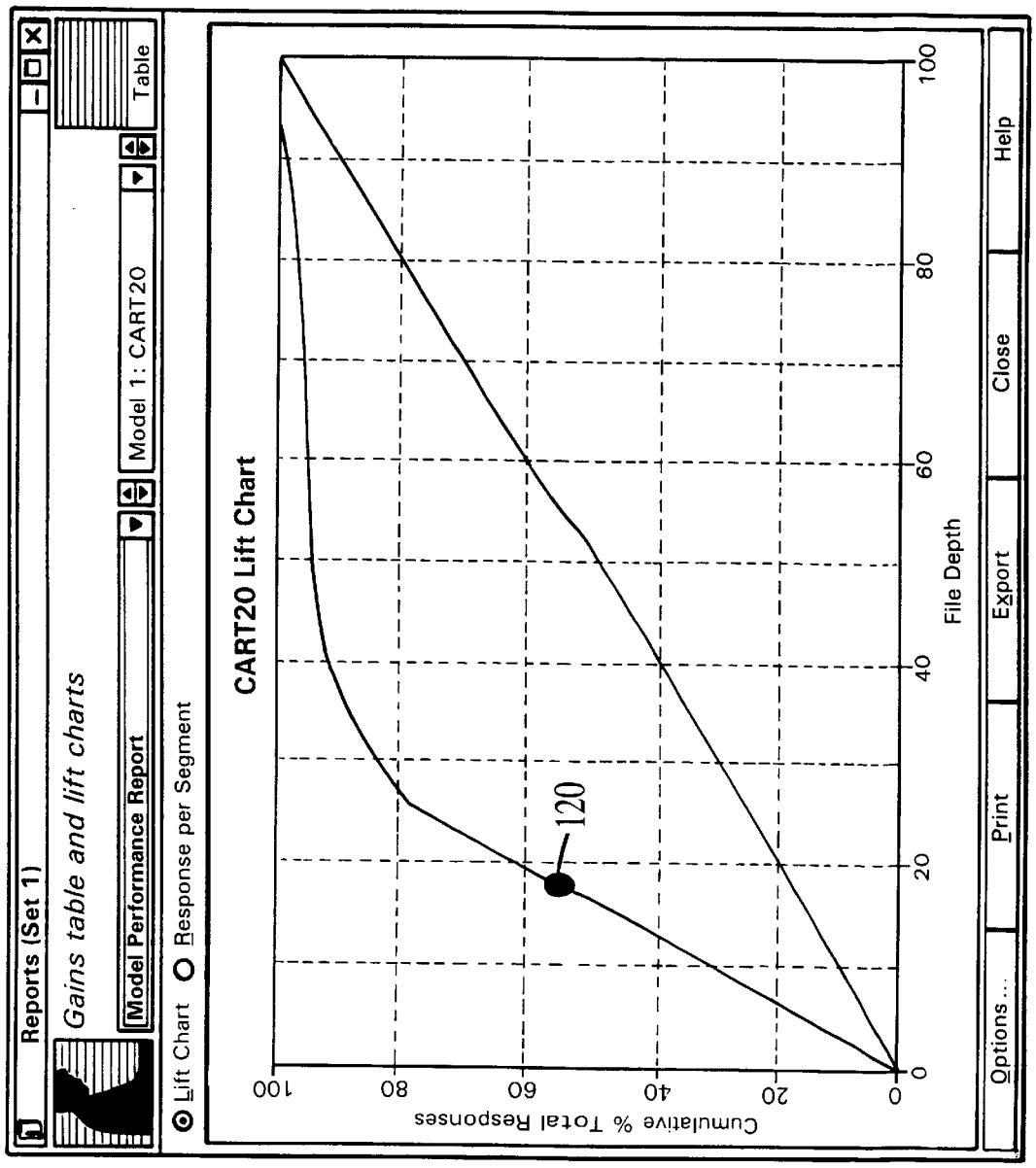
FIG. 6B is a diagram depicting a lift chart.

As shown in FIG. 6A, a response segment graph can be produced and can include a plurality of bars that represent normalized response rates. The first bar for segment 1 has height of 80.6723% the second bar for segment 2 has a height of 73.6842% and so forth. The height of the bars should typically monotonically decline, as the segment number increases. As shown, the bar for segment 6 has a height of 0.0000%, whereas that for segment 7 has a height of 3.3613%. The height of segment 7 violates the declining monotonicity which should be demonstrated in the response segment graph. This monotonicity is also violated for segments 8 and 9, but is restored for segment 10.

A summary lift chart (FIG. 6B) can be produced from this information. The Y-axis of the lift chart is the cumulative % total response from TABLE 1 and the x-axis which represents file depth is the cumulative number of records up to the particular segment, divided by the total number records in all of the segments. Thus, point 120 on the lift chart is determined by plotting the 54.55% cumulative percent total response at the file depth of 17.347% which is determined by dividing the value of the cumulative number of records e.g., 119, by the total number of records, e.g., 686.

Often a model may predict that a certain bin of data will have a certain response rate, whereas, in fact, the actual response rate for that bin is higher or lower than the prediction. In the modeling process a non-monotonically declining response rate can occur with increasing data bin numbers.

Figure 7:
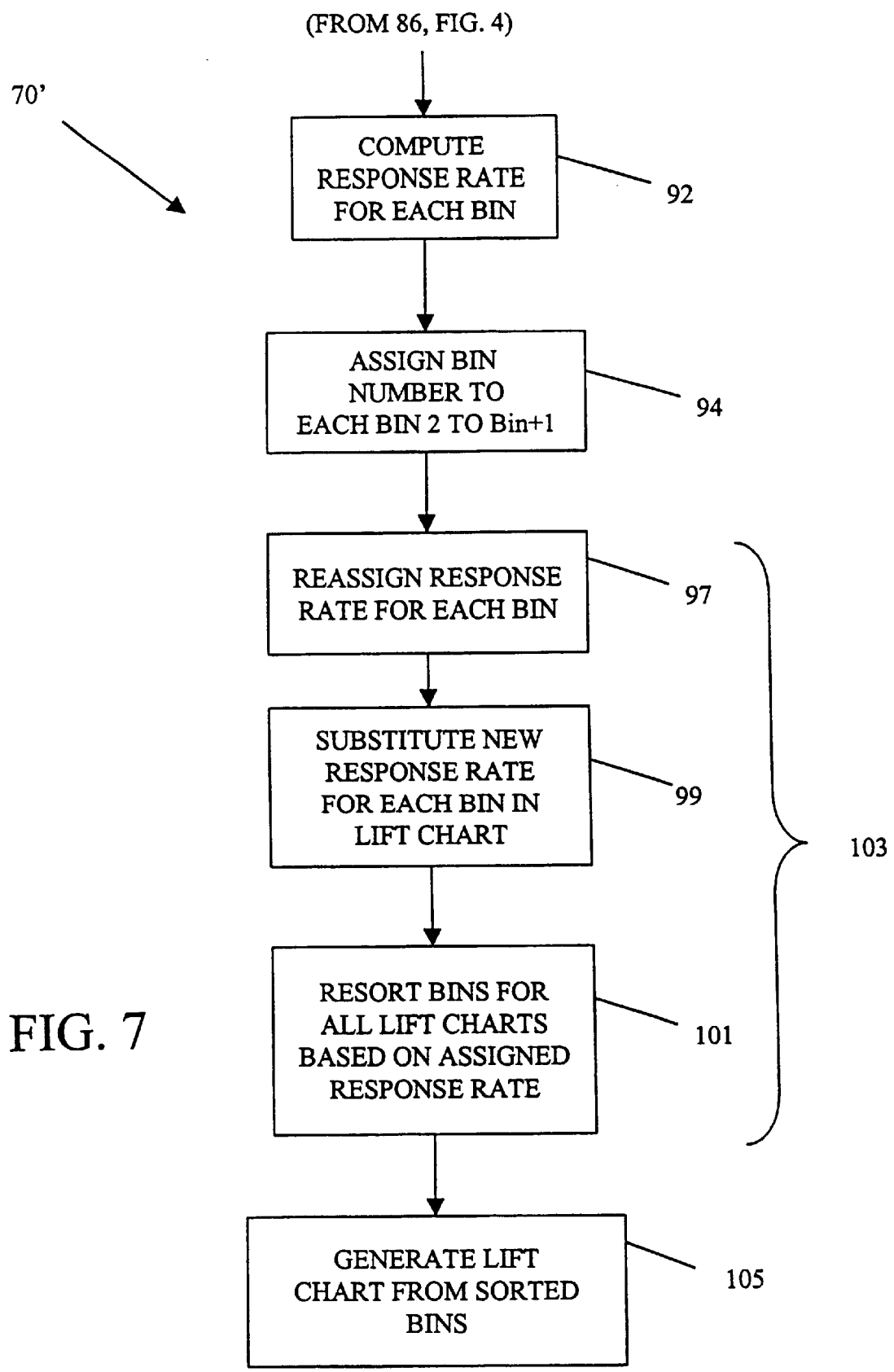
FIG. 7 is a block diagram of an alternative technique to produce a single lift chart representation from multiple model executions.

Referring now to FIG. 7, an alternative process for producing 70' a summary lift chart that takes into account non-monotonically declining response rates for bins is shown. The process 70' includes generating gains tables 34 (FIG. 4) and producing a number of bins 86 (FIG. 4). It also includes computing 92 the response rate for each bin and assigning 94 bin numbers to each record, as described above in conjunction with FIG. 5. The process 70' also includes a response rate smoothing process 103 to ensure that a monotonically declining response is provided for all bins, as a function of increasing bin number 66a.

One response rate smoothing process 103, reassigns 97 response rates for each of the bins using a mapping scheme to map actual response rates to artificial response rates based upon various factors. The process 32' substitutes 99 a new, reassigned response rate for selected bins and will resort 101 the bins again based upon the newly assigned response rate. Exemplary PRW macro code for Monotonically Decreasing Response Rates, as a function of increasing bin numbers, is shown below in TABLE 4.

TABLE 4

PRW Macro Code for Monotonically Decreasing Response Rates

```
V12:
; Recurse through column and make sure response rates are monotonically
; decreasing.
c =V7
a = INIT(101)
t = 1 to count (c)
epsilon = 0.01
a = if(c[t] >= a[t-1], a[t-1]-epsilon, c[t])
a1 = if(a = -epsilon, 0, a)
V12 = a1
```

The resorted bins are used to generate 105 a summary lift chart that combines results from all of the model executions and maintains monotonicity and order of bins within a model. Exemplary PRW Macro Code for Combining Multiple Lift Charts is shown below in TABLE 5.

TABLE 5

PRW Macro Code for Combining Multiple Lift Charts

```
Combined3:
; a, b, c = data ranges to be combined
; COLS = raw response rate, # resp, bin size, response, segment #, adj.
; response rate
a = V7:V12
b = V13:V18
c = V19:V24
; perform substitution of segment numbers with actual response rates
; Note: Seg #'s start at 2, so 0/1 of response column left untouched
as = select(4, 5, a) ; Response + Segment
ar = select(6, a) ; Adj. response rate
a1 = substitute(as, 2 to count(ar)+1, ar)
bs = select(4, 5, b) ; Response + Segment
br = select(6, b) ; Adj. response rate
b1 = substitute(bs, 2 to count(br)+1, br)
cs = select(4, 5, c) ; Response + Segment
cr = select(6, c) ; Adj. response rate
c1 = substitute(cs, 2 to count(cr)+1, cr)
; a1, b1, c1 each 2 cols: responses, substituted response rate
;sort 3 pairs of columns (merged together vertically) based on
; substituted response rate
score = (select(2, a1), select(2, b1), select(2, c1))
```

TABLE 5-continued

PRW Macro Code for Combining Multiple Lift Charts adj_resp = (select(1, a1), select(1, b1), select(1, c1))
sorted_response = sort(score, adj_resp, descend)
found_ones = sorted_response
nones= integral( found_ones )
totones= sum(found_ones)
n= count(sorted_response)
; x is the top % of total number of patterns
num_pats = offset(sorted_response)
x=offset(sorted_response)/n
; y is the number of responses w/in top %
y= nones/totones
x1 = (0, x)
y1 = (0, y)
Combined3 = {x1, y1}

The process 70' for producing a summary lift chart preserves the order of bins within each of the models 60a–60d so that a bin which was ordered in one of the models 60a–60d will never be sorted in an order ahead of other bins in the same model. This prevents the process 70' from switching the order of these bins within the same model. Since the modeling software is used to score or predict response behavior, it is typically undesirable to switch the order of such bins based upon actual knowledge of response behavior.

Figure 8:
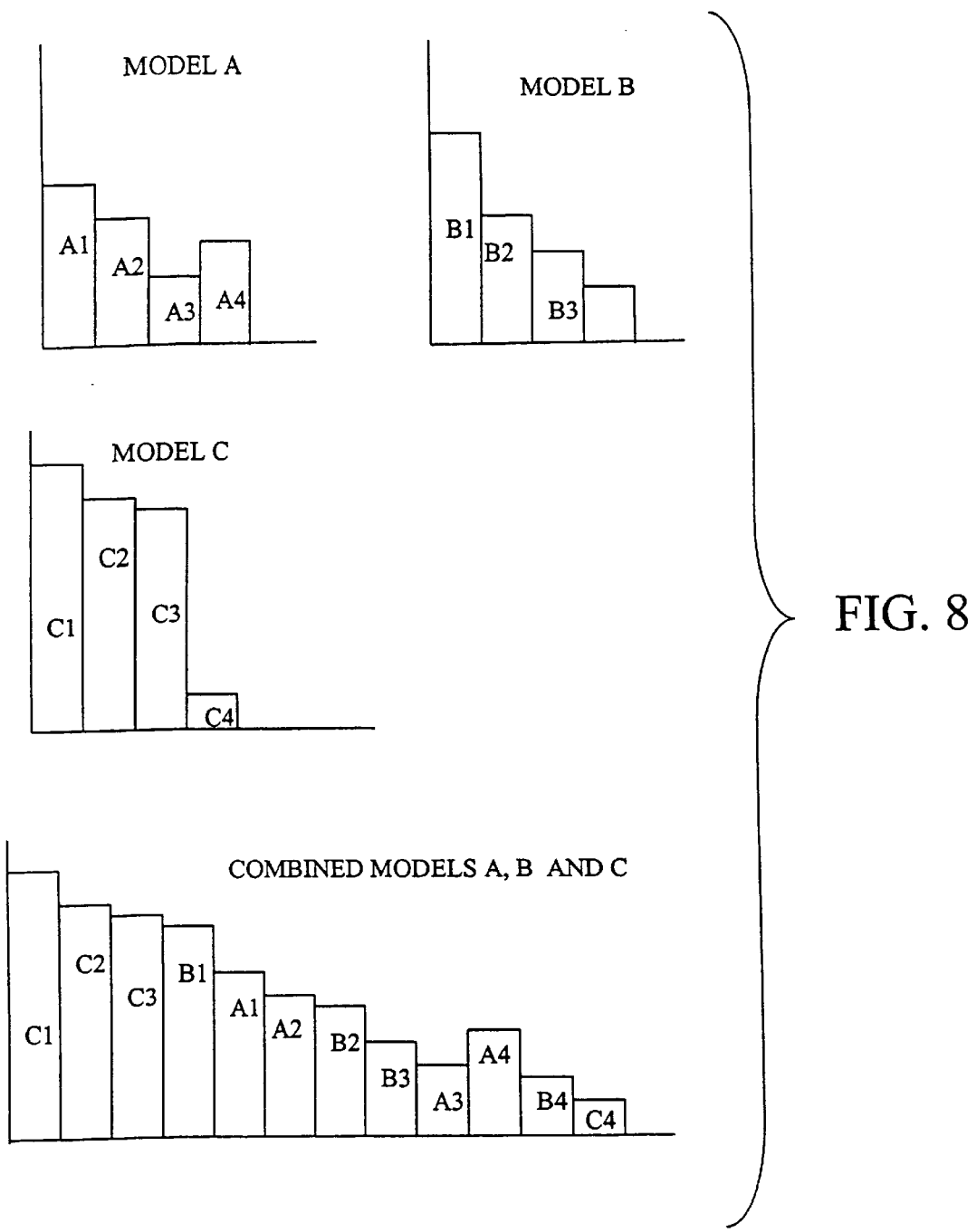
FIG. 8 is a diagram depicting a bin sorting that preserves bin order within a model instance.

As shown in FIG. 8, given models A, B, and C with specific model instance data with bins A1–A4, B1–B4, and C1–C4, the instance data are merged together and sorted in order. For example, assume that one of the model executions produces a response rate for each of the bins A1–A4. Assume that the first bin A1 had a 10% response rate, the second bin A2 a seven percent (7%) response rate, the third bin A3 an eight percent (8%) rate and so forth. As can be seen the response rate of bin A3 does not monotonically decrease as a function of bin number. The model assigned some records lower scores which actually turned out to be responder records. Thus, there were more responder records in the third bin A3 than there were in the second bin A2.

Nevertheless, it is generally best to preserve the order in the specific model instance, namely, bins should be sorted as A1, A2, A3 and A4 and not A1, A3, A2 and A4. In this example, assume that bins C1–C3 had the highest response rates.

Therefore bins C1–C3 are sorted first. These bins C1–C3 can be followed by B1, A1, A2, B2, B3, A3, A4, B4, and C4, as shown.

The only constraint imposed by this aspect of the invention, is that while the bins can be interleaved across all models, within a specific model the order of the bins are preserved. Therefore, A3 would not be sorted before A1, or between A1 and A2.

One technique for mapping new response rates to enforce this is to assign a bin number beginning with 2 to each record. If there are 1000 records in the dataset D1 and there are 10 bins, then the first hundred records are assigned to bin number 2, the next hundred are assigned to bin number 3, and so forth, and the last hundred are assigned to bin number 11.

A new response rate field 67a (FIG. 2A) for each bin is determined to maintain a monotonically decreasing rate over the bins to preserve the sorted order within a model execution. If the actual response rate for a bin that is now numbered 2 is 10% the records are all assigned a 10% rate. The next bin of records which are all labeled 3 assume has an actual response rate of 7% which is less than 10%, so records in bin 3 are assigned the rate of 7%. If the next bin 4 had an actual response rate of 8%, since that is higher that the response rate of the previous bin and it is from the same model or algorithm instance, it is assigned a value of 6.999 for example that will always force bin B4 to sort after bin B3.

The process 70' assigns or maps an artificial response rates to those bins that would change the order of bin sorts within a given model instance. Alteratively, rather than decreasing the rate of bin 4 the process 70' could have increased the rate of bin 3 to some value above 8.0, e.g., 8.001. In addition, the process 70' could have assigned bin 3 a rate of 7.5% and bin 4 a rate of 7.49% using a weighted average technique.

There are a number of other techniques for enforcing the constraint of monotonically decreasing response rates in the bins for a given model. One technique is to select the largest number of bins that does not violate the constraint. For example, in the case of 100 bins, bin 88 may have a higher rate than bin 87. In that case, the process could lower the number of bins just enough to avoid the occurrence. Another possibility is not to change the size of all the bins, but only the bins in the offending area(s). Thus, using the example of 100 bins, with bin 88 being higher than bin 87, the process could combine bin 87 and 88 into one large bin, producing a total of 99 bins, and repeating this combining procedure until there are no more violations.

With any of these techniques, it might be advantageous to perform some additional smoothing. Techniques such as least squares fitting to a linear or quadratic function, or linear interpolation between neighboring bins, or averaging using a sliding window could also be used.

Figure 9:
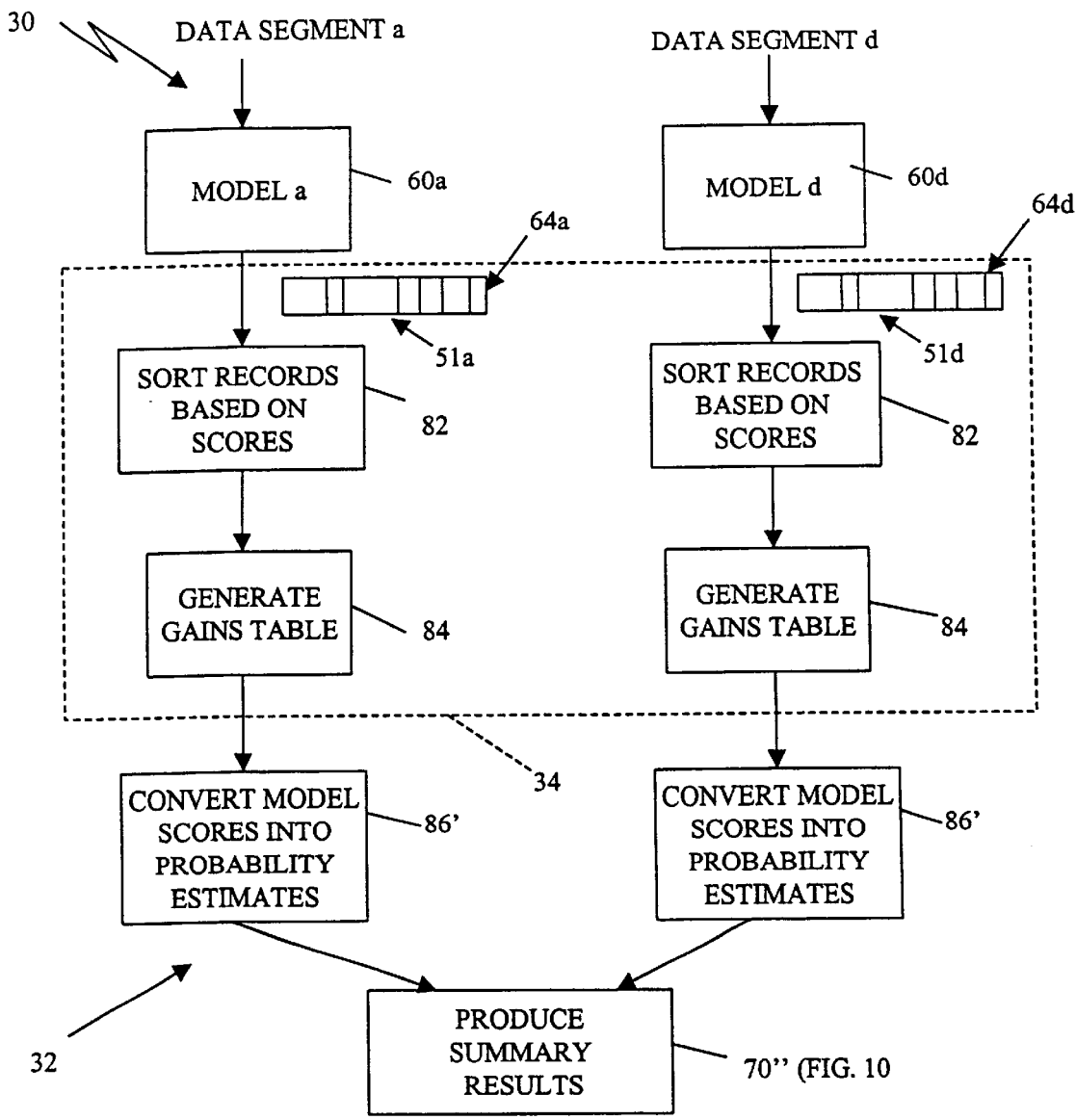
FIGS. 9 and 10 are flow charts depicting an alternative technique to produce a summary lift chart.

Referring now to FIG. 9, an alternative to using bins is to convert model scores into probability estimates. As in FIG. 4, the data mining software 30 uses here four models 60a–60d to score those records 51a–51d from respective data segments 52a–52d for which the respective one of models 60a–60d was designed, to produce results i.e., scores 64a–64d for each of the records 51a–51d. Results combining software 32' converts model scores into probability estimates and includes the process 34 (FIG. 4) that sorts 82 records in descending order based on the scores provided from executing the models 60a–60d on the data segments 52a–52d. Generally, higher scores are assumed to reflect a greater likelihood of the modeled response behavior. The process 34 generates 84 a gains table or derives a gains table for the data segment 52a–52d that the model 60a–60d scored. From the data in the gains table the process 32' also converts 86' model scores into probability estimates.

An algorithm that can be used to convert 86' model scores into probability estimates is given by Equation 1. Equation 1 converts model scores into probability estimates while also adjusting for cases where the data used to train the model was sampled with unequal weights given to positive and negative examples.

$$PRS = \frac{1}{1 + (1-y)/y * (1-orig)/orig * samp/(1-samp)} \quad \text{Equation 1}$$

where "PRS" is predicted response rate, "y" is the model score between 0 and 1, "orig" is the original response rate for the data segment (typically 1% to 2%), and "samp" is the sampled response rate for the training data for the model (typically 50%). For $y \geq 1$, the process will return 1 and for $y \leq 0$, it returns 0. In general, the conversion 86' replaces the binning process of 86 (FIG. 4) and modifies the summary result process 70 (FIG. 5) by having a summary result process sort records by probability estimates.

Figure 10:
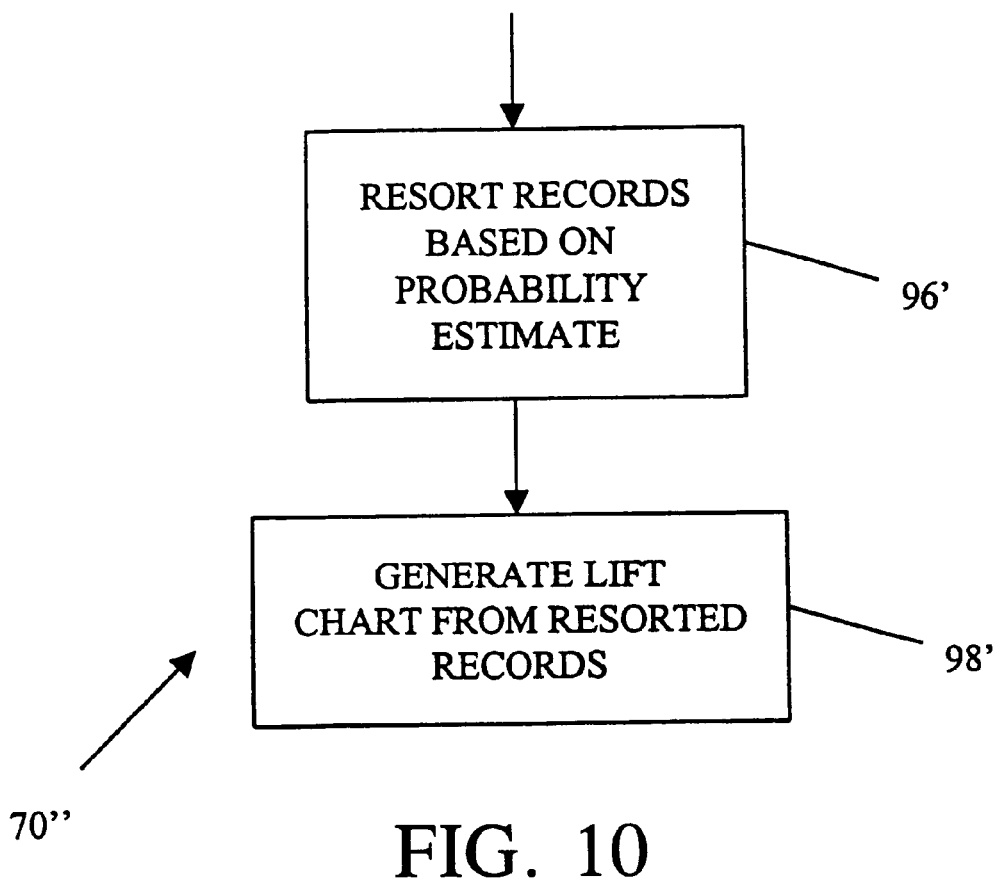

Referring now to FIG. 10, a process 70" to produce summary results is shown. The process resorts 96' records based on the determined probability estimates and generates 98' a summary lift chart from the resorted records.

When using Equation 1 above, it may be necessary to adjust the range of predicted response rates based on a comparison with the data. This should be done in such a way, as to preserve the average response rate. One way to accomplish this is to multiply the difference between the predicted response rate and the average response rate with an appropriate constant factor f. The best value for f can be determined by comparing the relative magnitude of the difference from the average response rate between the predicted response rate and the average response rate exhibited by the data at one or more places.

Examples that use results combining software 32 or 32' are set out below. It is to be understood that other examples are of course possible. As an example, consider data mining software 30 that models a mailing campaign. If a variable such as customer tenure is a known important variable for modeling whether or not a customer will respond to a particular mailing campaign, the models 60a–60d can be built to model the behavior of different customer groups based on tenure. Thus, for example, model 60a can be built to model the behavior for customers having less than 6 months tenure, model 60b can be built for customers between 6 and 18 months, model 60c for customers between 18 and 60 months, and model 60d for customers 60+ months tenure. That is, the models 60a–60d are designed to each operate with one of the data segments represented by partitioning the dataset into non-overlapping data segments based on tenure.

A second example uses the data mining software 30 to predict responses to communications, such as mailing lists. Thus, assume four mailing lists with each mailing list having a lift curve for persons represented in the list. The data mining software 30 can predict response rates for each list, producing lift charts and can combine the rates from the four lift charts into one summary lift chart. This can be used to help a decision maker decide which people in each list to mail information to.

A third example in database marketing is version testing. In version testing, different versions of offers are made to different groups of people and outcomes of the offers are evaluated. Different "versions" may represent different product offerings, different prices for the same product, or represent different communication channels and so forth. By test mailing each offer to a randomly selected subsample of the total population, the results can be modeled separately and then combined to determine the best offer to send to an individual (i.e., which offer will generate the best response for that prospect). Also, a decision maker can determine the optimal mailing point in a combined lift chart (across all models). Thus, this example may, in fact, involve the results combining software 32 evaluating different models, (e.g., algorithm types, learning parameters, etc.), as may also be true of the other examples.

Figure 11:
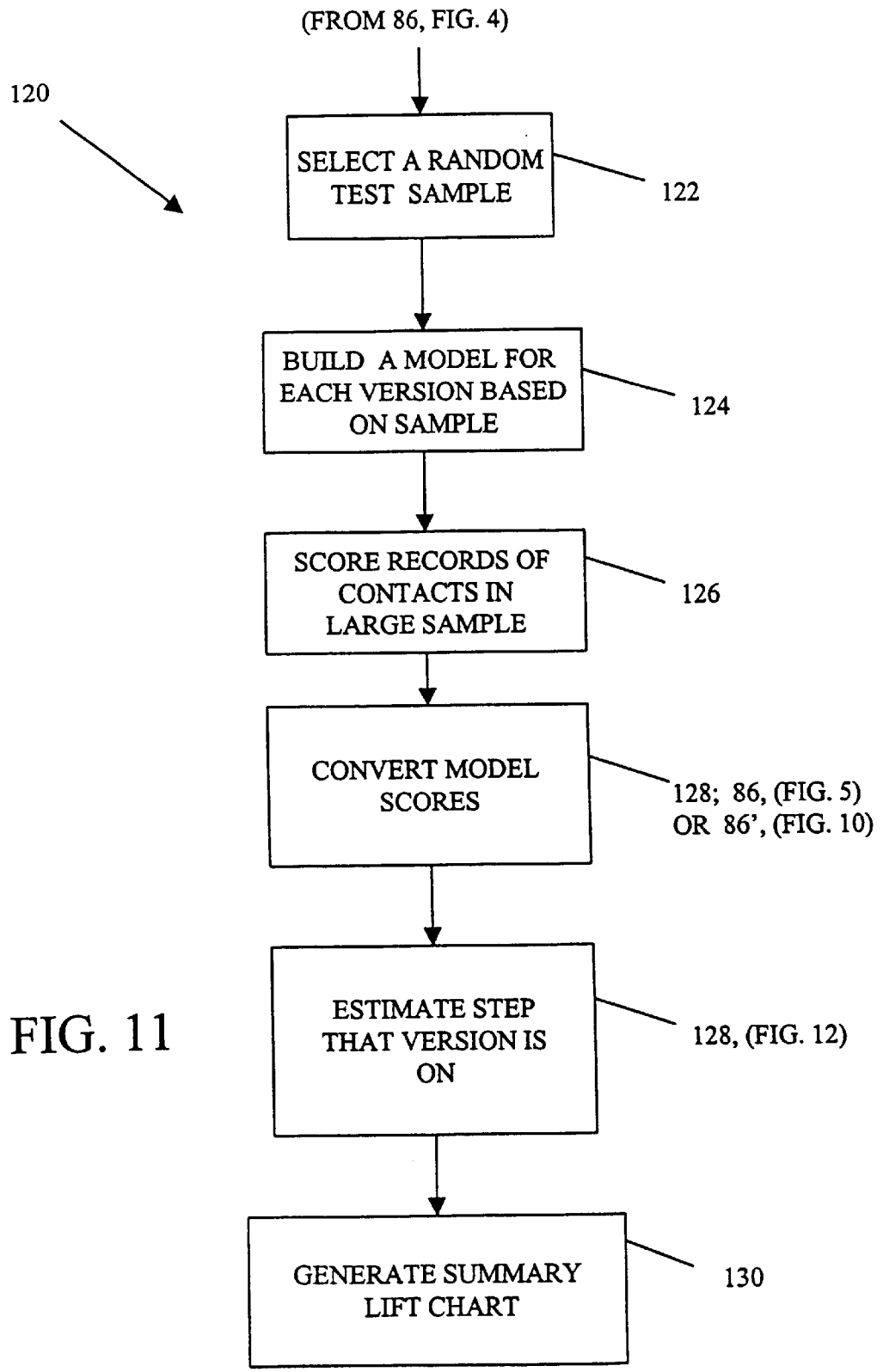
FIGS. 11–13 are flow charts that depict a process to model multiple-version data mining problems.

Referring now to FIG. 11, a process 120 to provide summary results particularly useful for version testing problems is shown. For each version/offer to be tested, the process 120 selects 122 a random test sample to contact. The process 120 will build 124 a model for each version, based on each version's random sample. The process will score 126 a large dataset of potential contacts using each version's model. The process 120 converts 128 model scores into response rate predictions e.g., "probability scores". This conversion 128 can be done using either of the two methods described above i.e., the binning process 86 (FIG. 5) or the probability conversion process 86' (FIG. 10). The process 120 can take into consideration several factors. For example, in situations where the cost/mailing changes with volume like a step function, the process can estimate 130 which step each version is expected to be on. The process can generate a summary lift chart 132 that can combine the results from the various versions.

Figure 12:
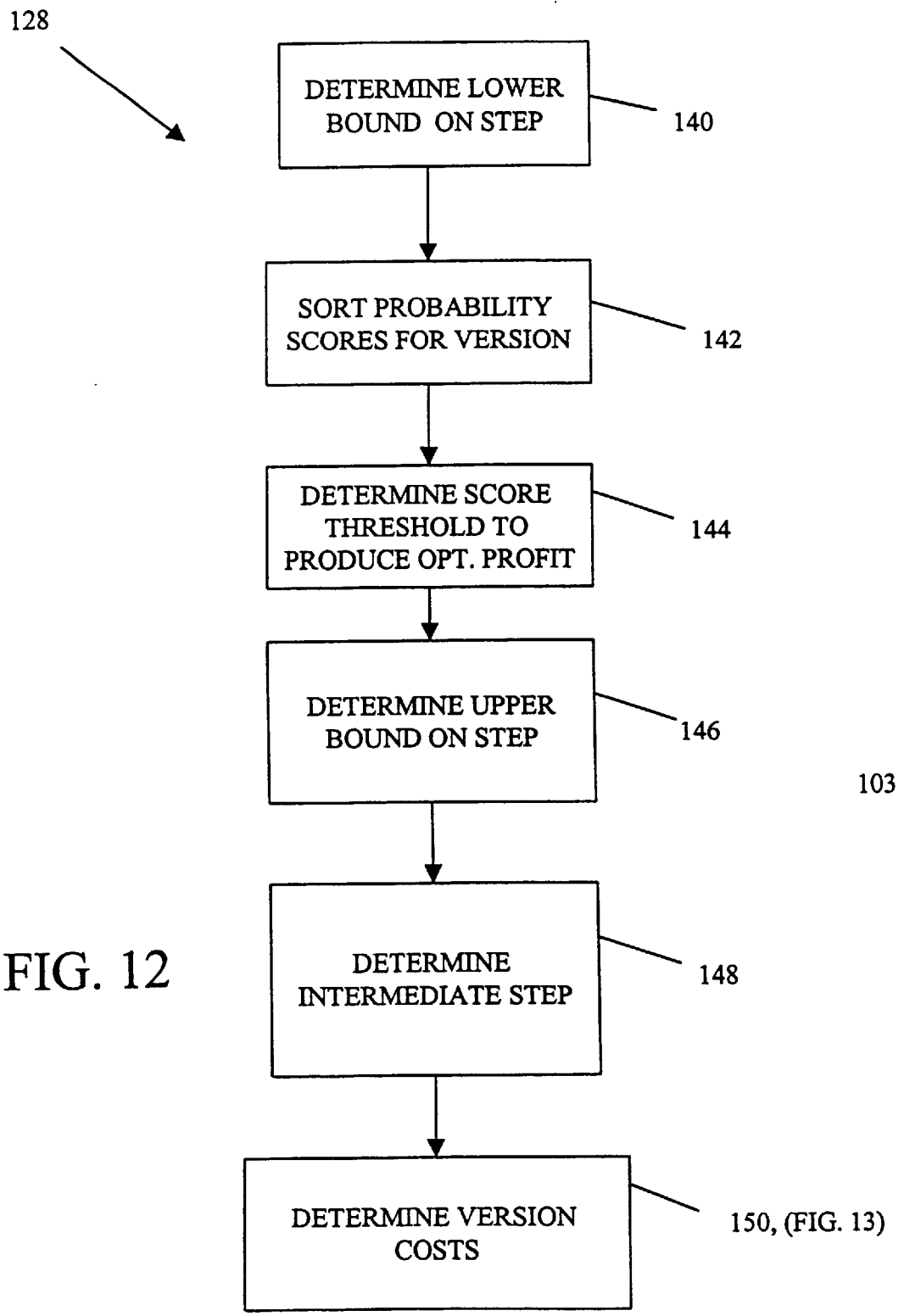

Referring now to FIG. 12, the process 128 to estimate the step that each version will be on would find 140 an approximate lower bound on the step for each version by considering each version independently, sorting (or binning) 142 the probability scores for that version, and determining 144 a score threshold that produces an optimal profit for that version considered by itself. Determining 144 a score threshold involves subtracting the cost at each possible mailing depth from the expected revenue at that depth (obtained by summing the cumulative probability scores and multiplying by a profit/responder). Any up-front costs such as creative costs are subtracted from the optimal profit for each version as considered independently. If the result is not profitable for any version, the version can be removed from further consideration. These lower bounds on cost step for each version can be considered "base" costs.

Likewise, upper bounds may be computed 146 independently for each version by determining the highest cost steps where they are still profitable.

An appropriate intermediate step for each version is found 148 between its upper and lower bounds. This intermediate cost step will be used to allow the process 128 to assume a fixed cost. Selection of the step may take into account the total number of versions, the amount of "overlap" or customers flagged to be mailed multiple versions when selected independently, how much of the overlap would be "won" by a version when comparing its profit with competing versions (assuming base costs for all versions), and the cost structure of each version when moving between upper and lower bounds.

The process 128 assumes that in addition to up-front costs, each version has its own fixed cost per mailing. Given fixed cost/mailing and profit/responder for each version, the process converts 150 to "profit scores" for the n versions. For versions that do not have up-front costs, maintaining a running sum described below can be skipped and everything is performed in one pass.

Figure 13:
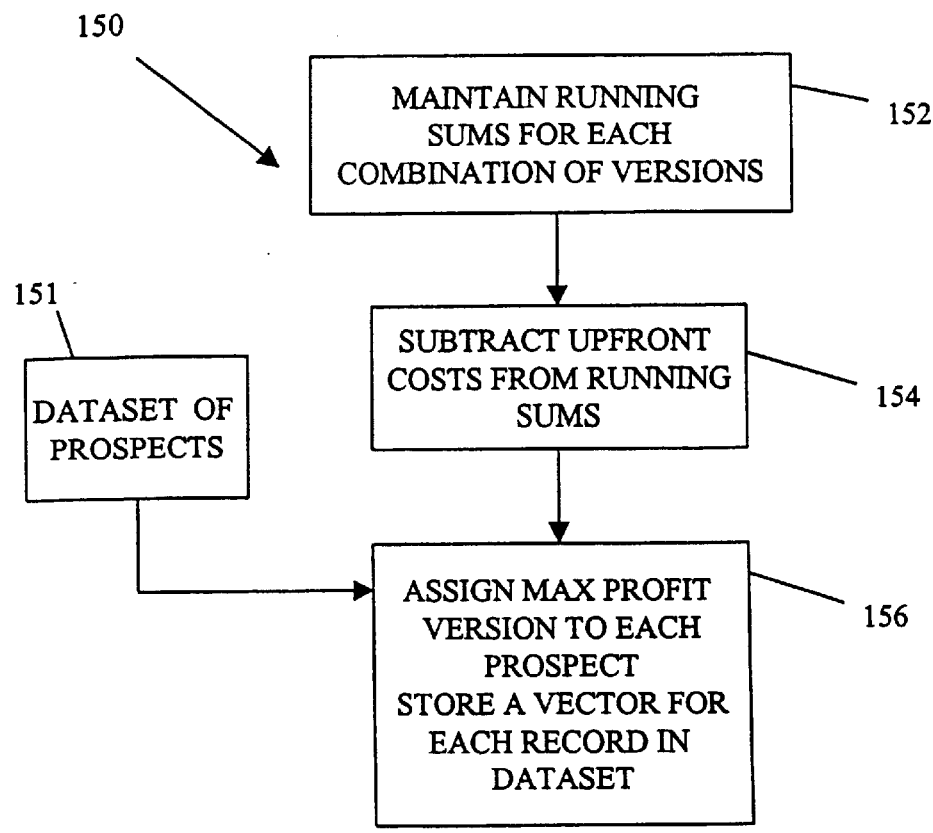

Referring now to FIG. 13, for versions that have up-front costs, the cost conversion process 150 maintains 152 ($2^n-1$) running sums through the dataset 151, one for each possible combination of versions. The cost process 150 adds the maximum profit score (i.e., max profit>0) considering only versions that are "on" in that combination for each running sum. The process 150 subtracts 154 the appropriate up-front costs from the running total for each combination of versions to determine which combination is best. The process 150 passes through the dataset 151 given the final combination of versions and assigns 156 the maximum profit version (or no-mail) to each potential customer.

Assigning 156 the version could be done in the same pass by storing a length ($2^n-1$) vector for each row in the dataset 151. In the case where the process assumed a fixed cost/mailing that was dependent on achieving a particular volume, and that volume is not achieved, the process need not change what versions are mailed but could lower the estimated profit due to the increased mailing costs.

When the models operate on each of the data segments, they can produce a simple lift chart to show the performance of the model for that segment of data. While a single lift chart may provide useful results, the single lift chart does not indicate the usefulness of the multiple model approach. That is, the performance of individual models based on data segmented can not be directly compared to that of a single, non-segmented model, to determine whether the improvement, if any, exhibited with the multiple data segment modeling approach justifies the additional modeling expenses associated therewith. Thus a summary lift chart that combines results from multiple model executions on segmented data provides a technique to allow a decision maker to determine whether the improvement, if any, associated with the multiple model executions on segmented data approach justifies the additional modeling expense.

In addition, the approach set out above allows for modeling real world modeling problems where a single variable or set of input variables have a significantly strong influence on predicting behavioral outcomes. The approach allows for execution of multiple models based on selective segmentation of data using models designed for and trained with the particular data segments. With the results combining approach the results from these multiple segmented-model executions are combined into a single, summary representation of the results. The multiple segmented-model executions can be combined into a single, summary representation of the results that maintains an order of results within a model execution while arranging results in descending order among different model executions.

The results combining software provides an optimal combination of results from multiple models. The results can be rendered in any of a number of ways to a user. For example, summary RMS error and $R^2$ values, or a confusion matrix, or summary gains table or summary lift chart can be used.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method executed on a computer for modeling expected behavior of entities represented in a dataset of records comprises:
   scoring records of a dataset that is segmented into a plurality of data segments by executing a plurality of models each model to produce a result that indicates a prediction of the expected behavior; and
   converting scores of the records into probability estimates that correspond to the prediction of the expected behavior, the converting further comprising adjusting probabilities assigned to scores of records based on whether data used to train models had adjusted weights assigned to positive and negative examples of the data, wherein converting is provided in accordance with:

$$PRS = \frac{1}{1 + (1-y)/y * (1 - orig)/orig * samp/(1 - samp)}$$

where "PRS" is predicted response rate, "y" is model score between 0 and 1, "orig" is an original response rate for the data segment, and "samp" is the sampled response rate for the training data for the model.

2. The method of claim 1, wherein for y1, the algorithm will return 1 and for y0, it returns 0.

3. A method executed on a computer for modeling expected behavior of entities represented in a dataset of records comprises:
   scoring records of a dataset that is segmented into a plurality of data segments by executing a plurality of models each model to produce a result that indicates a prediction of the expected behavior;
   converting scores of the records into probability estimates that correspond to the prediction of the expected behavior; and
   combining results obtained from converting scores of the records into probability estimates into a single representation of the expected behavior, combining further comprising sorting records by probability estimates, wherein probability estimates are provided in accordance with:

$$PRS = \frac{1}{1 + (1-y)/y * (1 - orig)/orig * samp/(1 - samp)}$$

where "PRS" is predicted response rate, "y" is model score between 0 and 1, "orig" is an original response rate for the data segment, and "samp" is the sampled response rate for the training data for the model.

4. A method executed on a computer for modeling expected behavior of entities represented in a dataset of records comprises scoring records of a dataset that is segmented into a plurality of data segments by executing a plurality of models each model to produce a result that indicates a prediction of the expected behavior, scoring further comprising sorting records based scores for the records produced by executing the models, generating a gains table based on the sorted records, and converting sorted scores of the records into probability estimates, wherein converting is provided in accordance with:

$$PRS = \frac{1}{1 + (1-y)/y * (1 - orig)/orig * samp/(1 - samp)}$$

where "PRS" is predicted response rate, "y" is model score between 0 and 1, "orig" is an original response rate for the data segment, and "samp" is the sampled response rate for the training data for the model, and wherein for $y \geq 1$, the converting will return 1 and for $y \leq 0$, converting returns 0.

5. A method executed on a computer for modeling expected behavior of entities represented in a dataset of records, the method comprising:
   scoring records of a dataset that is segmented into a plurality of data segments by executing a like plurality of models on records of the segments of the dataset, the scoring further comprising establishing a plurality of bins and assigning each of the records based on a score for the record to one of the plurality of bins; and
   combining results obtained from scoring the records into a single representation of the expected behavior, the combining further comprising resorting bins for all of the models in an order based upon an average score determined for each of the bins.

6. The method of claim 5 wherein scoring further comprises reassigning response rates for at least one of the bins to produce a monotonically decreasing response rate within a single model instance for the plurality of bins.

7. The method of claim 6 wherein combining further comprises resorting bins in accordance with the reassigned response rates.

8. A method executed on a computer for modeling expected behavior of entities represented in a dataset of records, the method comprises:

scoring records of a dataset that is segmented into a plurality of data segments by executing a like plurality of models on records of the segments of the dataset;

combining results obtained from scoring the records into a single representation of the expected behavior, the combining further comprising for each segment:

establishing a plurality of bins to assign records to;

assigning each record to one of the bins based on the record's score;

computing an average response rate for each bin based on scores of records in the bin; and assigning bin numbers to each record with the bin number being assigned consecutively across all data segments of all models.

9. The method of claim 8 wherein combining further comprises:

reassigning response for bins that have response rates that are non-monotonically decreasing over the bin umbers, to produce monotonically decreasing response rates over bins of a single model instance, as a function of increasing bin number.

10. The method of claim 8 wherein combining further comprises:

resorting the bins based upon the newly assigned response rate.

11. The method of claim 10 wherein combining further comprises:

generating a summary lift chart that combines results from all of the model executions from the resorted bins.

12. The method of claim 10 wherein the models are designed to score the plurality of data segments with at least some of the data segments being score by two of the models.

13. A computer program product residing on a computer readable medium for modeling expected behavior of entities represented in a dataset of records comprises instructions for causing a computer to:

score records using a plurality of models produced for individual ones of a like plurality of segments of the dataset, with the dataset segmented into the plurality of data segments based on some expertise applied to the dataset, wherein instructions that cause the computer to score further comprises instructions that cause the computer to reassign response rates for at least one of the bins to produce a monotonically decreasing response rate for the plurality of bins; and combine results obtained from scoring the multiple models into a single representation of the expected behavior.

14. A computer program product residing on a computer readable medium for modeling expected behavior of entities represented in a dataset of records comprises instructions for causing a computer to:

score records using a plurality of models produced for individual ones of a like plurality of segments of the dataset, with the dataset segmented into the plurality of data segments based on some expertise applied to the dataset;

combine results obtained from scoring the multiple models into a single representation of the expected behavior, wherein instructions that cause the computer to combine further comprises instructions that cause the computer to resort bins in accordance with the reassigned response rates.

15. A computer program product residing on a computer readable medium for modeling expected behavior of entities represented in a dataset of records comprises instructions for causing a computer to:

score records using a plurality of models produced for individual ones of a like plurality of segments of the dataset, with the dataset segmented into the plurality of data segments based on some expertise applied to the dataset;

combine results obtained from scoring the multiple models into a single representation of the expected behavior, establish a plurality of bins to assign records to;

assign each record to one of the bins based on the record's score;

compute a response rate for each bin based on scores of records in last bin; and assign bin numbers to each record with the bin number assigned consecutively across all segments of all models.

16. The computer program product of claim 15 wherein instructions that cause the computer to combine further comprises instructions that cause the computer to:

reassign a response rate for selected bins to produce a monotonic response as a function of increasing bin number.

17. The computer program product of claim 16 wherein instructions that cause the computer to combine further comprises instructions that cause the computer to:

resorting the bins based upon the newly assigned response rate.

18. The computer program product of claim 17 wherein instructions that cause the computer to combine further comprises instructions that cause the computer to:

generating a summary lift chart that combines results from all of the model executions from the resorted bins.

* * * * *